United States Patent
Healy et al.

[15] 3,655,471
[45] Apr. 11, 1972

[54] METHOD OF PRODUCING A FIBROUS SHEET COMPOSITION

[72] Inventors: Lawrence W. Healy, P.O. Box 504, Johnsonville, S.C. 29555; Wu Lan Wang, 298 Crafton Ave., Newark, N.J.; Tsu-Huai Wang, 17 Paisley Drive, Wilmington, Del. 19808

[22] Filed: Aug. 28, 1970

[21] Appl. No.: 68,010

Related U.S. Application Data

[63] Continuation-in-part of Ser. No. 562,532, July 5, 1966,.

[52] U.S. Cl. ............................156/148, 156/77, 156/309, 161/154, 161/155, 161/170
[51] Int. Cl. ...................................................B32b 31/12
[58] Field of Search..................156/72, 148, 77, 314, 306, 156/309; 28/72.2; 161/154, 155, 151, 170

[56] References Cited

UNITED STATES PATENTS

| | | | |
|---|---|---|---|
| 3,010,180 | 11/1961 | Hoffman | 28/72.2 |
| 3,059,312 | 10/1962 | Jameson | 156/148 |
| 3,067,483 | 12/1962 | Hollowell | 28/80 |
| 3,355,535 | 11/1967 | Hain et al. | 161/160 X |
| 3,383,273 | 5/1968 | Pearson et al. | 161/154 |
| 3,407,104 | 10/1968 | Crandall | 156/212 |

*Primary Examiner*—Carl D. Quarforth
*Assistant Examiner*—Gary G. Solyst
*Attorney*—Henry T. Burke, Robert Scobey, Robert S. Dunham, P. E. Henninger, Lester W. Clark, Gerald W. Griffin, Thomas F. Moran, R. Bradlee Boal and Christopher C. Dunham

[57] ABSTRACT

Leather like compositions are produced by needling a fleece into a foam, compressing resulting product, depositing an elastomer into the compressed product, again compressing and optionally coating.

7 Claims, No Drawings

METHOD OF PRODUCING A FIBROUS SHEET COMPOSITION

RELATED APPLICATIONS

This application is a continuation-in-part of copending application Ser. No. 562,532 now abandoned.

This invention relates to novel, supple fibrous sheet compositions and to processes for making the same. More particularly, it relates to compositions possessing the desirable properties of natural leather.

Natural leather has found wide use in decorative and functional products because of its desirable qualities such as appearance, ability to absorb or transmit moisture vapor, breathability, suppleness, accommodation, tensile strength, tear strength, plasticity, set, abrasion resistance, transpiration, etc. However, a number of problems are associated with natural leather. Leather is a natural product and therefore exhibits wide variations in quality, size, etc. It also does not possess a desirably high resistance to chemical and biological attack as well as to deterioration caused by heat or by abrasion, flexing and other mechanical stresses.

To avoid these drawbacks of natural leather, it has been proposed to produce synthetic, supple sheet compositions to replace leather in such areas as shoes, cothing, pocketbooks, upholstery, industrial belting, sporting goods, decorative items and the like. Such compositions as have been proposed are essentially laminates of two or more layers of various substances, and while they are capable of emulating the properties of leather in one or more respects, they are deficient in others. More importantly, they do not have the desirable balance of physical and chemical properties inherent in natural leather which makes the natural product suitable for such a wide variety of uses. Thus synthetic products which have heretofore been prepared may be equal or even superior to natural leather in one or more properties such as tear strength, but deficient in other properties such as breathability, moisture transmission, wet strength, plasticity, set, tear resistance, and puncture resistance. Moreover, since they are laminates, they are subject to fracture at the interface of the layers.

One of the principal reasons for these deficiencies in synthetic products is that they fail to reproduce the structure of natural leather, which is not a laminate. Natural leather comprises an interlocking system of fibers or fiber bundles running through its entire thickness. The fibers are free to move slightly in any direction to neutralize applied stresses. Because of the three dimensional interweaving, in contrast to laminated structures of synthetic products, natural leather is substantially free of weak layers. For these reasons leather has good tear and puncture resistance.

In natural leather most of the fibers are long, thin and highly flexible. This flexibility would be lost if there were a rigid cementing substance between the fibers, as in the case with wood. Natural leather is substantially devoid of rigid cementing substance between the fibers. Instead the fibers are separated by a relatively soft, resilient fatty substance which holds the fibers apart, but does not prevent their restricted movement within the body of the leather. Thus the fibers retain their flexibility so that the natural product is flexible, and, because the fibers are able to move in the fatty matrix, they are able to adjust themselves to react to an applied stress and thereby to disperse the stress over several fibers.

Porosity is an extremely important property of natural leather for use in shoe uppers. The natural product has good breathability because almost half of its bulk is occupied by air distributed in extremely fine pores between fibers so that there are no large voids or empty spaces. These fine pores confer low bulk density and good thermal insulation. They permit the passage of water vapor through leather and yet, because they are so small, offer considerable resistance to the transmission of liquid water.

One of the most important properties of natural leather for use in shoe uppers is its ability to be deformed by the application of pressure and to retain substantially its deformed configuration when the pressure is removed. Thus, the natural product may be stretched to conform to the configuration of a last and it will retain substantially the shape of the last when the last is removed. This property, which is attributable to the plasticity of natural leather is referred to as set. Natural leather will assume a new set during the breaking in period of the shoe. When the shoe is worn the leather will deform from its lasted shape in response to the stresses applied in wear and assume and retain the configuration of the foot. Such synthetic products as have heretofor been described are especially deficient in this quality. Some of them will not even take the original set of the last, unless they are lasted under special conditions. Others, while they will take the set of the last will not take the set of the foot. Either they resist the deformation stresses applied by the foot during wear and too readily return to their original shape, or they do not retain the shape of the shoe and therefore become distorted. In the first instances, shoes made from such synthetic products, unless they are fitted with extreme care are initially uncomfortable each time they are worn. The discomfort continues during each wearing period until the shoes adapt to the feet. As soon as the shoes are taken off, they reassume their original shape and must be broken in again. This necessity for extreme care in the original fitting means that many more sizes should be made available to insure consumer comfort. This is a distinct disadvantage. In the second instance the shoe readily assumes the shape of the foot, but continues to stretch in all directions when subjected to various stresses. It never returns exactly to its prestressed condition, with the result that the shoe very quickly loses any semblance of its original shape.

The processes which have been proposed for the manufacture and use of the synthetic product have been difficult or inconvenient, requiring precise control of temperature, humidity or other process conditions. Accordingly, no relatively inexpensive, completely satisfactory technique for preparing supple sheet compositions having the desirable properties of natural leather has been described.

It is an object of this invention to provide novel supple fibrous sheet compositions and processes for making the same. It is a further object to provide novel leather substitutes, especially useful in the manufacture of shoe uppers, although not limited thereto.

This invention provides products having the desirable properties of natural leather. It does so by providing for the preparation of a supple sheet construction containing a fiber network in which the fibers are not arranged in discrete substantially separate layers as in laminated structures, but are completely distributed throughout the whole of the composite body. Moreover the fibers are not fixed in position so that they are free to move slightly when the structure is subjected to stress, for example the stress of lasting. The fact that the fibers in the products of this invention are relatively although not completely restricted in their movement is apparent from a consideration of the fact that the products can be elongated sufficiently to be lasted in accordance with the usual lasting techniques, but will resist further elongation. In fact if stresses substantially higher than those usually associated with lasting of leather are applied to the products they will rupture, thus indicating that the fibers have reached the limit of their ability to move to neutralize stresses.

The novel compositions of this invention are breathable composite structures comprising an interlocking network of fibers and foam having a soft, resilient elastomeric filler material dispersed throughout the networks substantially although not completely filling the void spaces between the fiber and the foam. The compositions are similar to natural leather in structure in that they are not laminates, but integral structures in which the fiber portion is distributed throughout the whole cross-section. As in natural leather, the fibers are disposed in a soft, resilient body of cellular product and filler so that the fibers are not totally restricted in their movement and are free to move in a restricted manner in response to stress.

Each of the components of the system contributes in a particular way to the final leather like properties of the system. The elimination of any one of them results in an unsatisfactory product. A system containing only fiber and foam would be deficient for some end uses since it would be easily deformed under stress and, on removal of stress, would tend to stay in the deformed conformation. With each new stress it would assume a new configuration. If the product were lasted, it would readily assume the shape of the last. The shoe would similarly readily conform to the shape of the foot. However, the various stresses occasioned in the wearing of the shoe would force it into new configurations, with the result that after only a short period of use the shoe would be completely deformed. The reason for this is that the foam alone is not capable of building enough resiliency into the product. The product has only a limited memory and is not capable of reassuming its approximate original configuration after the deforming stress is removed.

A product containing only fiber and elastomer would react in a different manner. It would be readily lasted, but when the last is removed there would be a strong tendency for it to return to its original configuration. A shoe made from this product would expand in response to the stresses of wear, but would return to its original configuration when removed from the foot. Thus the shoe would never be broken in. The reason for this is that the elastomer has a substantially complete memory and tends to return to its original dimensions when a stress is removed.

Fibers by themselves have substantially no memory, but their presence in the compositions build in the desired physical properties of the leather like compositions such as tear strength, tensile strength, burst strength and the like.

A combination of elastomer and foam would not have any of the properties of natural leather to a useful degree.

In this invention the characteristics of the three components are properly balanced to produce products having properties simulating the properties of natural leather. Thus products are produced which have the tensile strength, elongation, burst strength, plasticity, transpiration, water vapor absorbtion, breathability and other physical characteristics of the natural product as well as the aesthetic properties such as appearance, break, accommodation, hand, suppleness and the like. It has also been found that by varying the identity and relative quantity of the three components and the formulation procedure it is possible to prepare a variety of leather substitutes having the exact balance of physical properties and aesthetic properties appropriate to particular end uses.

The preferred cellular product is polyurethane foam because it is readily available, easy to work with tough and abrasion resistant.

Flexible cellular polyurethanes as the term is commonly used in the art, are foams which give an ultimate elongation of at least about 100 percent at room temperature and have the ability to deform readily under load. Typical foams which are useful in the practice of this invention are those requiring a compression of about 3 to 100 pounds per 50 square inches to produce a 25 percent deflection, measurements being made on a two inch sample at 25° C. in accordance with ASTM test number 1564-59T for indent load deflection. The foam sheet will preferably have a tensile strength of between about 5 to 35 p.s.i., an ultimate elongation between about 100 and 400 percent and a tear strength of about 0.6 to 5 pounds per inch. The preferred foams will also have between about 25 and 100 cells per linear inch and a density of the order of about 0.8 to 6 pounds per cubic foot.

The flexible cellular polyurethane employed in the practice of this invention is prepared by the reaction of an organic polyisocyanate with an organic compound having at least two isocyanate-reactive hydrogen atoms. Preferably, the organic compound having at least two reactive hydrogen atoms will have a molecular weight of at least 200. It can be a polyalkylene polyether prepared by polymerizing an alkylene glycol or alkylene oxide. The useful polyethers include polyethylene glycol, polypropylene glycol, polytetramethylene glycol, copolymers of glycols with triols such as 1,2,6-hexanetriol or trimethylol propane, copolymers of two or more oxides, such as ethylene oxide-propylene oxide copolymers, etc. It can also be a polyester such as those prepared by reacting ethylene glycol, propylene glycol, tetramethylene glycol, hexanetriol, trimethylol propane and polymers thereof with dicarboxylic acids such as those derived from castor oil, tall oil fatty acids, and other fatty acids; or dicarboxylic acids such as adipic acid, succinic acid, maleic acid, phthalic acid, etc.

Useful organic polyisocyanates include arylene diisocyanates or triisocyanates, typically tolylene diisocyanate, phenylene diisocyanate, tolylene triisocyanate, benzidine diisocyanate, mesitylene diisocyanate, durylene diisocyanate, naphthalene diisocyanate, etc.; aliphatic polyisocyanates, typically hexamethylene diisocyanate, 4,4'-methylene bis(cyclohexyl isocyanate), decamethylene diisocyanate, etc. The preferred polyisocyanates are the arylene diisocyanates and particularly the commercially available 80,20 mixture of 2,4 and 2,6-tolylene diisocyanate.

The cellular polyurethanes are prepared by reacting an organic polyisocyanate, typically tolylene diisocyanate with the organic compound having reactive hydrogen atoms in the presence of a gas-producing agent. The gas-producing agent may be water, which reacts with the isocyanate to form carbon dioxide, or it may be an inert, volatile liquid or a gas. Additional components such as cell-modifiers, emulsifiers, dyes, etc. may also be present.

The preferred cellular polyurethanes are flexible cellular polyether or polyester urethanes. They may have an open-cell or closed-cell structure, but open cells are preferred. The term "open-cell" means that at least about 90 percent of the cells are interconnecting and free of cell-separating membranes. Open-cell cellular polyurethanes can be prepared by suitable foaming techniques or by chemically, mechanically or explosively opening the cells of a closed cell foam, A particularly preferred polyurethane foam for use in the practice of this invention is a polyurethane foam in which there is dispersed a thermoplastic vinylidene chloride polymer containing at least about 25 percent by weight chlorine, the total chlorine content of the foam plus polymer being at least about 10 percent, the softening temperature being about 300° F. These foams are described and claimed in copending U.S. Pat. application Ser. No. 544,362 filed Apr. 22, 1966 which is assigned to General Foam Corporation. The foams are prepared by reacting an organic polyisocyanate and a compound containing active hydrogen atoms such as a polyether or a polyester in the presence of a gas producing agent such as water and the selected chlorine containing polymer which is substantially incompatible with the urethane forming components of the mixture. The amount of chlorine containing polymer added should be sufficient to give a final composition containing at least 10 percent by weight of chlorine based on the total weight of the composition. For convenience these foams will be referred to herein as halogen containing foams. A particular advantage of these foams is that the fiber-foam combinations containing them develop a substantially permanent set under less rigorous compression conditions then are required for other fiber-foam combinations. The combinations therefore are of substantially uniform density and can be impregnated as described below to produce highly satisfactory substrates.

After the foam is prepared, generally in the form of a bun, it is formed into sheets suitable for use in this invention by any suitable technique such as slicing, splitting or peeling the bun. The thickness of the sheet may vary over a wide range depending upon the proposed ultimate product. Sheets from 0.02 to 1.5 inches are typically employed, although both narrower and thicker sheets are useful for some purposes. For patent leather products the selected sheet thickness will normally be from about 0.063 to 0.5 inches.

The fiber-foam combination for use in preparing the products of this invention are prepared by placing a fibrous mat on one side of a cellular sheet, preferably a polyurethane sheet and physically forcing a plurality of the fibers through the sheet. The fibrous mat employed may be any woven or non-woven mat in which the individual fibers have sufficient freedom of movement so that they can be forced into the foam to achieve the desired degree of penetration. Non-woven mats of comparatively loose construction are favored. Such mats include loosely knitted yarn structures, webs produced by carding or air-laying, etc. Fabrics having a density between about 3 ounces per square yard and 24 ounces per square yard are generally suitable. The presently preferred fibrous mats are cross-laid, non-woven webs having a density of about 6 to 16 ounces per square yard. Two or more superimposed mats may be used.

The fibrous mat may be made from any common natural or synthetic fiber such as polyesters, acrylics, polyamides, modacrylics, vinyls, cellulosics, wool, silk, etc. The preferred fibers are organic fibers, most preferably synthetic organic fibers. They can be polyamides, such as polyhexamethylene adipamide (nylon 6,6) or polycaproamide (nylon 6); polyesters, such as polyethylene terephthalate or polydimethylcyclohexyl terephthalate; acrylics such as polyacrylonitrile; vinyls, such as polyvinyl chloride or polyvinyl alcohol; cellulosics such as rayon, etc. and wool. Mixtures of two or more fiber types such as mixtures containing wool-polyester and polyamide-polyester are especially useful.

As used herein, the term "fiber" includes tow, staple, continuous filament and similar fiber forms. The fibers may be present as yarns. They may be crimped (whether or not heat-set) or uncrimped. The fibers employed will generally have a denier between about 0.5 and 6 and preferably between 0.5 and 3.

The individual fibers should have a length at least sufficient to permit the desired degree of penetration of the cellular polyurethane sheet before it is compressed. Fiber lengths of at least about one-half inch are desirable. Fibers in conventional textile lengths are generally suitable for use in this invention.

Useful fillers or stuffing materials which may be employed in this invention include a wide variety of soft, resilient, thermoplastic or thermosetting materials including, for example polyurethanes and copolymers of butadiene and acrylonitrile. Polyurethane elastomers prepared from various polyethers or polyesters by reaction with polyfunctional isocyanates are especially preferred. They are prepared utilizing the same basic chemicals utilized in the production of polyurethane foams as described above, but under conditions such that they will not foam. They may contain various surfactants, lubricants, blowing agents, etc. They are a well known class of polymeric materials and are readily available from a number of commercial producers. Usually they are commercially available in organic liquids such as dimethylformamide.

In accordance with the presently preferred process of this invention the novel compositions are prepared by the steps comprising placing a fibrous mat on a flexible, uncompressed, cellular polyurethane foam sheet, forcing the fibers of said mat into said sheet to produce an integrated fiber-foam combination; compressing said fiber-foam combination at a temperature and pressure sufficient to cause the combination substantially to retain its compressed dimensions; impregnating the compressed product with a filler material; depositing the filler material into the substrate either by heating or by coagulation by the addition of a miscible liquid in which the elastomer is not appreciably soluble, and again compressing to produce a substantially permanently set product of the desired dimensions. With thin sheets of foam, e.g. up to 0.187 inches the initial compression step may be often omitted since the physical process of forcing fibers into the foam sheet accomplishes the desired result.

There is thus formed a three component system in which there are interlocking networks of fibers and foam with a dispersed, resilient, soft filler. The filler does not completely fill all of the void spaces between the fibers and the foam so that the whole composite is breathable.

The fibrous mat is physically placed on the polyurethane sheet and a plurality of fibers are physically forced into the sheet, preferably by needling. The degree of penetration of the fibers will be sufficient to bind the fibrous mat into an integrated unit. The degree of penetration required to do this will vary with the thickness of the sheet. Sufficient penetration will generally be achieved if at least 50 percent of the penetrating fibers penetrate at least about 75 percent of the sheet thickness and at least some of the fibers completely penetrate the sheet. It is preferred that at least 10 percent of the fibers completely penetrate the sheet. These penetrating fibers are then forced back into the sheet, and preferably completely through the sheet. The product is then preferably, although not necessarily lightly needled from the original side to force these ends back into the sheet. This procedure produces a product in which there are very few fiber ends projecting from either side of the sheet. Instead, such fibers as do protrude are exposed as loops. It is also convenient to place the sheet between two fibrous mats and to force fibers into the sheet from both sides.

Any suitable technique for forcing the fibers through the foam may be employed. The preferred method is needling the fibers into the foam by passing a plurality of needles through the fibrous mat and thereafter into the cellular polyurethane sheet. Needling is convenient, rapid, and minimizes the physical damage of the foam. Conventional needling devices such as needle looms can be used. Preferably, the needles used will be relatively fine needles having a number of barbs which snag the fibers and force them through the foam.

In order to obtain the desired integrated structure the fiber is first needled into the foam from one side at a penetration density of at least about 250 penetrations per square inch. Preferably, the total penetration density will be between about 500 and 1,500 penetrations per square inch. The product thus produced is then needled from the other side at a penetration density of at least about 100 penetrations per square inch and preferably 200 to 1,500 penetrations per square inch. If a third needling operation is employed, the penetration density is again at least about 100 and preferably 200 to 1,500, but the needles are adjusted so that the depth of penetration is insufficient to force the fibers completely through the sheet. Penetration densities of about one half as dense as those described will be preferably employed if the polyurethane sheet is placed between two fibrous mats and needled from both sides. Penetration densities in the upper end of the described ranges are preferably employed with the thicker cellular sheets and lower penetration densities are preferably employed with thinner cellular sheets.

The integrated fiber-foam combination formed by physically forcing fibers from the fibrous mat into the cellular polyurethane sheet is compressed at a temperature, pressure and time sufficient to give a product which, while not necessarily permanently set, shows only a limited tendency to return to its original thickness and then only very slowly. Compression devices such as nip rollers, rotary presses, platen presses or the like may be used. The precise compression parameters chosen will depend upon the nature and properties of the particular cellular polyurethane and fibers chosen, and, to a large extent, on the particular equipment used. The temperature employed should be sufficiently high to permit compression of the fiber-foam substrate under the pressure and time conditions employed, but not high enough to cause thermal decomposition of any of the components. The temperature should be lower than the temperature at which the fiber or the polyurethane flows at the pressure and time employed so that the fibers are not substantially deformed and the cellular structure of the polyurethane is not lost. Temperatures which are too low will not give the desired compression. Temperatures which are too high will cause decomposition of the combination or loss of its fiber or cellular qualities. Although the choice of the temperature used is dependent upon a consideration of the entire system, it will generally be in the range of about 230° F. to about 375° F.

The pressure employed will be sufficient to produce the desired compression of the substrate under the conditions employed, but insufficient to destroy the cellular structure of the polyurethane. The pressure required to produce compressed fiber-foam combinations having the desired density, thickness and percent compression may vary depending upon the system employed. For flat-bed presses, pressures of about 100 to 400 p.s.i. are suitable and pressures of about 250 to 325 p.s.i. are preferred.

The length of time for which the fiber-foam combination will be compressed will be sufficient to produce the desired degree of compression and physical properties. Compression times of from about 30 seconds to 15 minutes are generally satisfactory with flat-bed presses. Substantially shorter compression times may not produce the degree of compression desired. Compression times which are too long may result in loss of the desired structure. Where other equipment is used, the time of compression will be varied to produce equivalent compression conditions. For example, equivalent compression times for a rotary press are generally found to be somewhat lower than those utilized with a flat-bed press.

The product obtained after compression is a supple, integrated fiber-foam combination which contains a large number of void spaces and in which the fibers are held apart by the foam. The composition of the fiber-foam combination will depend upon the original thickness and density of the cellular polyurethane sheet and the thickness and weight of the fibrous mat used as starting components. Typically, the fiber-foam combination may comprise about 10 to 90 percent by weight fibers and about 10 to 90 percent by weight foam based on the total weight.

The integrated fiber-foam combination is next impregnated with the selected filler. Any suitable impregnation technique can be employed. The substrate may be simply soaked in a solution of the elastomer. Alternatively, the substrate may be passed through a set of compression rolls in a bath of the elastomer. Vacuum techniques in which the solution of the elastomer is applied to the substrate by a knife coater or similar device and then sucked into the substrate under vacuum to effect substantially complete penetration may also be employed.

The elastomer may be deposited in the substrate by treatment with a liquid which is miscible with the liquid carrier for the elastomer but in which the elastomer is not appreciably soluble, for example water. This causes the elastomer to precipitate from the solution. Precipitation may be conveniently effected by soaking the impregnated product in water, by spraying it with water or by subjecting it to a humid atmosphere. Alternatively, the elastomer may be deposited by heating the impregnated product, for example in an oven to evaporate the solvent. The baking temperature employed should be high enough to facilitate the removal of the solvent, but not high enough to cause the elastomer to flow. In either event the product is breathable, i.e. it has good water vapor transmission characteristics. The water wash technique produces a product which is somewhat more breathable than the baking technique since the filler in the product produced by the former procedure is itself a cellular structure comprising an interconnected series of micropores. The fact that the product is breathable no matter which technique is utilized clearly establishes that there are void spaces in the fiber-foam combination and that these spaces are not wholly filled in the substrate. Substrates prepared by the water-wash technique generally have better aesthetic properties, such as hand, break accommodation, etc., and this procedure is preferred where those qualities are important in the end use of the product.

The amount of dry elastomer added is from about 25 to about 75 percent by weight. The fiber content of the composition may vary from about 5 to 55 percent by weight and the foam content from about 5 to 60 percent by weight, all percentages being based on the total weight of the composition.

In the last step of the process for preparing the novel compositions of the invention, the fiber-foam combination with the deposited elastomer is again compressed under conditions so that the product becomes permanently set and the surface is smoothed. As used herein the term "permanently set" means that the product will not return to its original volume but will substantially retain the volume which it assumes when the heat and pressure are removed.

The processing conditions which are applied in the same manner as described above in connection with the initial compression step are: time, about 5 seconds to 3 minutes; temperature, about 65° to 325° F.; pressure, 50 to 300 p.s.i. The preferred conditions are 175° F. to 225° F. for 1 to 2 minutes at 125 to 175 p.s.i.

The product thus produced is similar in structure to natural leather. It has many of the physical and aesthetic properties of natural leather including hand, accommodation, drapability, etc. It may be buffed on one or both sides to improve its appearance. Generally, for commercial use, especially when intended for use as s shoe upper material it will be coated on at least one face with a flexible polymeric coating. This coating is referred to herein as a base coat, although the base coated product is suitable for many uses without additional coatings. It serves as a basis for additional coatings which may be applied to enhance the serviceability or aesthetic properties of the finished product. If desired, the flexible polymeric base coat may itself be the desired finish coating. The flexible polymer may be applied to the substrate in the form of a solution, an aqueous or non-aqueous dispersion, a plastisol, organosol, with or without a vehicle (i.e. in a 100% non-volatile form), etc. Application of the flexible polymer coating may be by any suitable technique such as curtain coating, spraying, cobweb spraying, roller-coating, knife-coating, casting, extruding, release-paper coating, calendering, etc. It may be applied as a paste, a viscous solution or dispersion, etc. Preferably it is applied in a viscous form so that it does not penetrate the interior of the novel foam-fiber-filler product to any substantial degree. It may be cured after applying if necessary.

The flexible polymer coating may comprise any polymeric composition which is sufficiently flexible and elastic to be compatible with the substrate. The principal purposes of the coating are to provide a finishable surface and, in preferred embodiments, to bind any fibers which may protrude from the surface of the foam. It will also desirably possess the ability to form a strong bond with the said substrate. Preferably, it will have a high degree of toughness and abrasion resistance.

The flexible polymer may be a polyurethane, a polyacrylate, a vinyl polymer such as polyvinyl chloride or polyvinylidene chloride, a polyester, a polyamide, an epoxy, etc. Preferably the flexible polymer will be a flexible polyurethane elastomer, as these materials generally possess the most desirable physical properties, notably abrasion resistance. Polyurethane elastomers are prepared by the reaction of organic polyisocyanates with compounds having at least two isocyanate-reactive hydrogen atoms, as herein-before described.

The organic compound having at least two isocyanate-reactive hydrogen atoms can be a polyether, a polyester, a polyamide, a polythioether, etc. or mixtures thereof. The preferred compounds are the polyalkylene polyethers and polyesters hereinbefore described.

Various alternative procedures may be employed in the preparation of the products of this invention. For example, the polyurethane sheet may be partially or totally impregnated with the selected filler before the needling operation. It is also possible to add the impregnant to the fiber-foam substrate before compression rather than after.

The novel sheet compositions of this invention are highly suitable for use as leather substitutes especially as shoe upper material. They may be finished with finish coatings on one or both surfaces.

The products of the invention may be treated with any of the usual agents used as finish coats with natural leather to improve appearance or extend durability, Any of the various leather coatings may be used. Various natural or synthetic resin coatings, especially acrylic resins or proteinaceous substances may be applied in accordance with standard practices to improve feel and appearance. A tie-coat, such as a copolymer of polyvinyl chloride-maleic anhydride may be employed to improve the bond between the flexible polymer base coat and the finish coat. Preferably, any coatings which are employed will be porous so that they do not detract from the breathability of the products of this invention. Breathability, however, is not essential for all of the various applications for which the supple sheet compositions of this invention are useful.

The total thickness of the coatings, including any base, tie or finish coating which may be applied, is preferably substantially less than the thickness of the compressed, filled fiber-foam substrate. This is desirable to prevent any substantial masking or alternation of the desirable properties of the substrate. Generally, the total coating thickness will be about 1 to 15 mils and preferably about 4 to 9 mils in the finished product. The base coat will normally comprise about 75 percent or more of the total thickness of the coatings.

The following non-limiting examples are given by way of illustration only.

EXAMPLES 1-29

These examples illustrate embodiments of this invention in which various foams, fibers and fillers are employed to prepare a number of different products within the scope of the invention.

The following table lists the identity and properties of the foams employed.

| Code letter | Foam [1] type | Density [2] | ILD [3] 25% | ILD [3] 50% | ILD [3] 65% | 65/25 modulus | Tens.[4] st. | Elong.[5] |
|---|---|---|---|---|---|---|---|---|
| A | PES | 1.65 | 19.5 | 24.8 | 33 | 1.69 | 15.5 | 275 |
| B | PES | 1.496 | 32.5 | | | | 16.6 | 229 |
| C | PESS | 1.794 | | | | | 32.9 | 367 |
| D | PEH | 1.556 | 22.2 | 32.0 | 47.7 | 2.14 | 8.7 | 156 |
| E | PEH | 1.629 | 19.0 | 26.7 | 40.0 | 2.10 | 10.8 | 186 |
| F | PEH | 1.370 | 22.5 | 31.0 | 45.5 | 2.02 | 11.5 | 195 |
| G | PEH | 1.317 | 23.0 | 28.4 | 40.5 | 1.76 | 10.2 | 173 |
| H | PEH | 1.430 | 20.0 | 27.5 | 40.0 | 2.0 | 11.1 | 198 |

[1] PES is high silicone content polyether polyurethane; PESS is high silicone content polyester polyurethane; PEH is halogen containing polyether polyurethane; PE is polyether polyurethane.
[2] Pounds per cubic foot.
[3] Indent load deflection.
[4] Pounds per square inch.
[5] Percent.

The fibers used are identified as follows:
1. A 1:1 mixture of 64-70's grade 12 month Texas wool with an average staple length of 2.5 inches together with AA combing (64-70's grade) pulled wool with an average staple length of 2 inches. A 9 ounce cross laid web.
2. A 6 ounce web of 1 underlying 2 ounce web of polyethylene terephthalate fiber with an average denier per filament of 1.5 and an average fiber length of 1.5 inches.
3. A 6 ounce web of 1 underlying a 3.75 ounce web of polyethylene terephthalate fiber with an average denier per filament of 1.5 and an average fiber length of 1.5 inches.
4. A 6 ounce web of 1 underlying a 2.5 ounce web of nylon with an average denier per filament of 1.5 and an average length of 1.5 inches.
5. An 8.5 ounce web of nylon with an average denier per filament of 1.5 and an average fiber length of 1.5 inches.
6. A 6 ounce nylon web with average denier per filament of 3.0 and an average fiber length of 1.5 inches underlying a 2.5 ounce web of nylon with an average denier per filament of 1.5 and an average fiber length of 1.5 inches.

In each instance the fiber web (or webs) was placed on a 0.125 inch thick sheet of the selected polyurethane and needled by passing the structure four times through a laboratory size needle loom set for complete penetration. The needled product was turned over and passed twice through the same loom with the needles set for the same depth. It was again reversed and passed twice through the loom, but with the needles set for incomplete penetration (2.56 inches). The penetration density per pass was 225 penetrations per square inch. The fiber foam combination was then compressed in a rotary press at a dwell time of 3 minutes and 11 seconds, a belt pressure of 700 pounds and a nip pressure of 1,200 pounds, and a temperature of 313° F. (With foams D, E, F and G the comparable values were: time 42 seconds; belt pressure 700 pounds; nip pressure 200 pounds; temperature 200° F..)

The resulting product was impregnated with 25 percent by weight, based on the total weight of the impregnated product, of a polyester polyurethane elastomer (Helastic 1356) dissolved in dimethyl formamide by applying a uniform coating of the elastomer solution to the combination with a knife coater and applying vacuum. The impregnated product was then treated in one of two ways, identified in the table below as "B" or "WW."

In the WW or water wash technique the product is soaked in water for 16 hours and dried at 200° F. After drying it was compressed in a flat press at 200° F. under a pressure of 150 pounds per square inch for one minute.

In the B or baking technique the product was baked in an oven at about 210° F. It was then soaked in water to wash away the excess silicone and dried at 200° F. It was finally compressed at 200° F. and 150 pounds per square inch pressure for 1 minute.

The composition of the elastomer used in the water wash technique is as follows:

| | |
|---|---|
| Helastic 1356 Wilmington Chemical Corporation | 150 parts by weight |
| Triton GR-5 (sulfinamide alkyl esters) Rohm & Haas Company | 5 parts by weight |
| Molecular Seive (powder 13X type Aluminosilicate) Union Carbide Corporation | 2 parts by weight |
| Cab-o-sil (silica powder) Cabot Corporation | 2 parts by weight |

The composition of the elastomer used in the baking technique is as follows:

| | |
|---|---|
| Helastic 1356 | 20 parts by weight |
| Triton GR-5 | 1 part by weight |
| Dimethyl formamide | 5 parts by weight |
| Methyl ethyl ketone | 5 parts by weight |
| Molecular Seive | 1 part by weight |
| Cab-o-sil | 0.4 parts by weight |
| Helastic 1322 | 10 parts by weight |

The surfactants, Molecular Seives and silica are added as viscosity regulators to aid in the impregnation. Helastic 1322 is a polyether base polyurethane elastomer in 20 percent by weight solution in dimethyl formamide.

The table below records the properties of the products obtained in the various examples. From the table it will be apparent that by varying the components in the system and the method of preparation it is possible to produce products having the desirable balance of physical properties which are inherent in natural leather.

| Foam | Fiber | Dry elastomer [1] B | Dry elastomer [1] WW | Burst str.[2] pounds | Set [3] | Thickness, inches | Ten. str.[4]/percent E [5] | Tear str.[6] | MVT [7] |
|---|---|---|---|---|---|---|---|---|---|
| A | 1 | | 94 | 127 | 25.3 | .060 | 317/54 | 8 | 104 |
| A | 1 | | 28 | 105 | 35.4 | .046 | 413/81 | 8 | 155.7 |
| A | 2 | 97 | | | 28.6 | .032 | | | |
| A | 2 | | 79 | 216 | 31.9 | .052 | 980/42 | 12 | |
| A | 2 | | 42 | 190 | 32.3 | .049 | 900/49 | 111 | |
| A | 3 | 101 | | | 32.5 | .042 | | | |
| A | 3 | 63 | | 212 | 31.9 | .053 | 1,019/41 | 18 | 111.4 |
| A | 3 | 55 | | 190 | 32.3 | .049 | 836/51 | 1o | |
| A | 4 | 100 | | | 23.4 | | | | |
| A | 4 | | 96 | 228 | 24.2 | .053 | 1,038/44 | 15 | 97.5 |
| A | 5 | 126 | | 460 | 18.4 | .055 | 2,400/43 | 22 | |
| A | 5 | | 69 | 435 | 27.2 | .062 | 2,163/43 | 22 | 99.6 |
| A | 6 | 98 | | | 30.4 | .045 | | | |
| A | 6 | | 103 | 355 | 22.8 | .055 | 2,128/51 | 22 | 82.7 |
| B | 6 | 119 | | 378 | 27.6 | .060 | 2,000/47 | 25 | |
| B | 6 | 110 | | | 23.8 | .046 | | | |
| B | 6 | | 67 | 331 | 25.8 | .046 | 2,200/50 | 19 | |
| C | 6 | 116 | | | | .045 | | | |
| C | 6 | | 67 | 352 | 23.1 | .058 | 2,050/49 | 23 | |
| D | 6 | 107 | | | 24.0 | .046 | | | |
| D | 6 | | 106 | 240 | 24.2 | .044 | 2,135/46 | 14 | |
| E | 6 | 110 | | | 25.7 | .046 | | | |
| E | 6 | | 100 | 313 | 25.0 | .056 | 1,736/48 | 17 | |
| F | 6 | 79 | | 265 | 23.3 | .048 | 2,040/42 | 19 | |
| F | 6 | | 113 | 318 | 23.1 | .048 | 1,980/45 | 16 | |
| G | 6 | 113 | | | 24.2 | .053 | | | |
| G | 6 | | 108 | 332 | 28.2 | .058 | 1,534/41 | 16 | |
| H | 6 | 72 | | 345 | 17.9 | .046 | 1,892/42 | 18 | |
| H | 6 | | 103 | 332 | 22.8 | .050 | 1,680/45 | 17 | |

1. Percent by weight of impregnant based on weight of fiber-foam.

2. Determined in accordance with ASTM D2210–64.

3. In percent, determined by SATRA test described below.

4. Determined in accordance with ASTM D2209–64.

5. Determined in accordance with ASTM D2211–64.

6. Determined in accordance with ASTM D2212–64.

7. Determined in accordance with test described below.

In each of 4, 5 and 6, the recorded value is the value determined by averaging four values, two in the warp direction and two in the weft direction.

The test used in determining the percent set of the products of this invention is the test described in the Information Sheet of the Shoe And Filled Trades Research Association (Ref. No.: STD. 110) dated Dec., 1961. In this test a circular disc of the product to be tested is clamped about its periphery and the product is stretched a predetermined amount by forcing a hemispherically shaped boss against its lower surface. The sample is held in position a fixed period of time and the boss is released. The sample is then allowed to stand for a fixed period of time and the amount of retained stretch measured. Percent set is calculated from these values. In these examples the initial stress period is 5 minutes, and the retained stretch is measured after 5 minutes.

In the test used to determine moisture vapor transmission 10 ml. of water is placed in a flanged cup known as the Payne Permeability Cup. The sample to be tested is placed over the cup and held in place by clamping it between circular ring and the flange of the cup. The loaded cup is then placed in a dessicator over anhydrous calcium chloride at a substantially constant temperature. The cup is reweighed at the end of 24 hours to determine the weight of water which has permeated through the test sample and is thus lost from the cup. This value is recorded as the moisture vapor transmission.

EXAMPLE 30

In this example a 0.25 inch thick sheet of polyurethane foam of the type identified as B in the previous examples was employed. Separate fiber webs, each of 5.5 ounce air laid 3 denier by 1.5 inch super crimped nylon were placed on each side of the sheet. The structure was passed four times through a laboratory size needle loom with 40 gauge "no kick-up" barbed needles set for complete penetration. The product was turned over and passed four more times through the loom at the same needle setting. It was again turned over and passed once through the loom with the needles set for incomplete penetration. The penetration density for each pass was 225 penetrations per square inch. The fiber foam combination was compressed in a rotary press at a dwell time of 3 minutes and 11 seconds at a belt pressure of 700 pounds and a nip pressure of 1,200 pounds and a temperature of about 313° F. The resulting product was then impregnated with an equal weight of a polyester based polyurethane elastomer in a 25 percent by weight solution of dimethyl formamide. The impregnated product was water washed as described in the previous examples except that the final compression was effected in a rotary press at a temperature of 240° F, a dwell time of 18 seconds, a belt pressure of 700 pounds and a nip pressure of 200 pounds. The resulting material is coated with a vinyl chloride plastisol to give a product having the appearance and physical properties suitable for leather upholstery.

EXAMPLE 31

A 24 ounce web of wool of the type identified 1 in the previous examples is laid on a 1.5 inch thick sheet of polyurethane of the type identified as C in the previous examples. The structure was passed once through a laboratory size needle loom with fine guage needles set for complete penetration. The penetration density was 250 penetrations per square inch. The product was turned over and again passed six times through the same loom at the same needle setting. It was again reversed and passed once through a needle loom with the needles set for incomplete penetration at a penetration density of 100 penetrations per square inch. The fiber foam combination was pressed in a flat press at a temperature of 230° F. and a pressure of 100 pounds per square inch for 15 minutes. It was then impregnated with twice its weight of a polyether-polyurethane elastomer in a 25 percent by weight solution in dimethyl formamide by passing the combination through a bath of the elastomer equipped with squeeze rolls. The impregnated product was baked as described in the previous examples and pressed in a flat press for 5 seconds at a temperature of 250° F. and a pressure of 300 pounds per square inch. It was then lightly buffed on both sides. Separate portions of the thus produced product were coated with a variety of base coats, finish coats and tie coats of the type generally employed with natural leather. The resulting products when tested were found to have physical properties within the ranges generally found with natural leather and were judged to have excellent hand, drape, break, temper, and flexibility closely approximating these same properties in natural leather.

EXAMPLE 32

A 3 ounce web of fiber of the class identified as 4 in the previous examples was laid on a 0.187 inch thick sheet of polyurethane of the type identified as E in the previous examples. It was passed through a laboratory size needle loom six times on each side with the needles set for complete penetration, the total penetration density on each side being 1,500 penetrations per square inch. It was then passed once through a needle loom with the needles set for incomplete penetration at a density of 100 penetrations per square inch. The resulting product was then impregnated with 75 percent of its weight of a 25 percent by weight solution of a polyester based polyurethane elastomer in dimethyl formamide and water washed as described in the previous examples. It was then compressed in a flat press at a temperature of 250° F. and pressure of 300 pounds per square inch for a period of 3 minutes. The product was then coated with a polyvinyl chloride base coat and with a patent leather finish coat. The resulting product had the physical properties and appearance of patent leather, and was suitable for use as such.

What is claimed is:

1. A process for the production of breathable, supple, fibrous sheet composition suitable as a replacement for natural leather comprising the steps of:

laying a fleece of fibers having a denier of 0.5 to 6 and a density of from about 3 to 24 ounces per square yard onto a sheet of flexible polyurethane foam having a thickness of from about 0.02 to 1.5 inches, and a density of from 0.8 to 6 pounds per cubic foot;

forcing a plurality of the fibers of said fleece into the foam by needling at a penetration density of from 500 to 1,500 penetrations per square inch, the penetration being such that at least 50 percent of the fibers penetrate at least about 75 percent of the thickness of the foam sheet and at least 10 percent of said fibers completely penetrate the foam sheet;

reversing resulting product and needling the opposite side at penetration density of from 200 to 1,500 penetrations per square inch to force the completely penetrating fibers back onto the foam sheet, to produce a fiber-foam combination containing from about 10 to 90 percent fibers by weight and 10 percent to 90 percent foam by weight based on the total weight;

compressing resulting fiber-foam combination at an elevated temperature of at least 230° F., but below that temperature at which the fiber or foam will flow:

impregnating resulting compressed fiber-foam combination with a solution of a soft, resilient, elastomeric filler dissolved in a solvent, and depositing said filler as a cellular product with an interconnected series of micropores by treatment of the impregnated combination with a liquid which is miscible with the solvent for the elastomer but does not appreciably dissolve the elastomer, and compressing resulting product at a temperature of from about 65° to 325° F. to produce a permanently set fiber-foam-filler combination containing from about 30 percent to 70 percent by weight elastomeric filler, 5 percent to 55 percent by weight fiber and 10 percent to 60 percent by weight foam, all based on the total weight of the resulting product, the fibers and foam comprising an interlocking network having void spaces therebetween the fibers being distributed throughout the whole cross-section thereof, the filler being dispersed throughout said network, and partly filling said void spaces, the fibers being capable of restricted movement within said network.

2. The process of claim 1 wherein the polyurethane foam is a polyester of a polyether polyurethane.

3. The process of claim 1 wherein the fibers are synthetic organic fibers, natural fibers or mixtures of synthetic organic fibers and natural fibers.

4. The process of claim 1 including the further step of coating said fibrous sheet composition with a polymeric coating.

5. The process of claim 1 including the further step of coating said fibrous sheet composition with a breathable polymeric coating.

6. The process of claim 1 wherein the solvent is removed and the filler is deposited by the addition of a liquid which is immiscible with the solvent and does not dissolve the filler.

7. The process of claim 6 wherein the filler is a polyurethane elastomer.

* * * * *